United States Patent [19]
Stefani

[11] 3,785,215
[45] Jan. 15, 1974

[54] PAWL AND RATCHET INDEXING MECHANISM FOR ON-OFF SWITCHING

[75] Inventor: Joseph P. Stefani, Warwick, R.I.

[73] Assignee: General Electric Company, Providence, R.I.

[22] Filed: Mar. 31, 1972

[21] Appl. No.: 239,908

[52] U.S. Cl. .................... 74/142, 200/156
[51] Int. Cl. ............................. F16h 27/02
[58] Field of Search............ 74/142, 126, 128, 74/577, 575; 200/156, 153 J

[56] References Cited
UNITED STATES PATENTS

| 3,136,167 | 6/1964 | Morner | 74/128 X |
| 2,997,840 | 8/1961 | Ruger | 74/126 X |
| 3,381,103 | 4/1968 | Duffield et al. | 200/156 |
| 2,990,723 | 7/1961 | Holpuch | 74/142 |
| 3,657,936 | 4/1972 | Judd | 74/128 |

*Primary Examiner*—Charles J. Myhre
*Assistant Examiner*—Wesley S. Ratliff, Jr.
*Attorney*—Paul E. Rochford et al.

[57] ABSTRACT

An improved indexing mechanism is provided for generating an indexed rotary motion from a reciprocating plunger motion. In the mechanism a plunger adapted for linear motion along its longitudinal axis has a pivotable actuator mounted at its end. On a plunge stroke the actuator pushes on a tooth of a set of ratchet teeth mounted about a rotor where the rotor axis is set generally at a right angle to the plunger axis. On a return stroke, under the urging of a return spring, the actuator pivots about its point of support on the plunger as the actuator passes over the ratchet.

6 Claims, 6 Drawing Figures

PATENTED JAN 15 1974 3,785,215

PAWL AND RATCHET INDEXING MECHANISM FOR ON-OFF SWITCHING

CROSS REFERENCE TO RELATED APPLICATION

A patent application, Ser. No. 31,626 filed Apr. 24, 1970 and assigned by the assignee of this application, now Pat. No. 3,657,936 is copending with this application and teaches another indexing mechanism having a rotary element bearing a combination of ratchet teeth and cams.

BACKGROUND OF THE INVENTION

The present invention relates to an indexing mechanism useful in obtaining controlled rotary motion responsive to actuation of a plunger under a push-push linear motion. Specifically, the present invention relates to a mechanism by which the movement of the contact arms of an electric switch are controlled by cams disposed on a rotar. The movement of the rotor is controlled in turn by a plunger which undergoes linear motion along its longitudinal axis and which delivers incremental steps of rotary motion through a reciprocating actuator acting against ratchet teeth also disposed on the rotor.

A number of switch mechanisms having a rotor bearing a combination of ratchet teeth and cams are known in the art. Such U.S. Pat. Nos. included 3,381,103; 3,045,501; 3,136,167; 2,997,840; 2,991,344; 2,965,737; 2,933,578; 3,440,429; and doubtlessly others. All of these switches have mechanisms which rotate a rotor by the cooperation of a plunger element undergoing linear motion along its axis and operating against the teeth of the ratched portion of the rotor and causing the selective rotation of the rotor in discreet essentially equal movements.

Also these patents teach the control of the movement of electrical contact arms by cams where such a contact arm has the form of a leaf spring bearing an electrical contact on some portion thereof. Controlled movement of the electrical contacts is accomplished by the action of cams, formed integrally with or mounted on the rotor, against the contact arms. These cams cause a movement of a movable electrical contact toward or displacement of the movable electric contact away from a stationary electrical contact.

A switch mechanism as desribed in a copending application, Ser. No. 31,626 filed Apr. 24, 1970, now U.S. Pat. No. 3,657,936 and assigned to the same assignee as this application has been used advantageously in dimmers. The subject application is directed toward an improvement over the mechanism taught in the copending application.

As pointed out in the copending application, in the construction and use of dimmers there is a preference that the size of a knob on a push-in actuator be relatively large so that, in addition to facilitating turning the switch on or off by the push-in motion, the level of power which the switch permits to pass to the controlled electrical load may be closely regulated by the turning of the knob. For this purpose the knob should be large enough so that it may be gripped comfortably by the fingers of the operator and so that a smooth rotary motion may be imparted to the control mechanism within the dimmer to set the lighting level or other power level at the desired intensity. But because the knob is so large, there is a tendency also to impart to it a force, in switching the light on or off, which is greater than that applied in many conventional switches which have actuators only large enough for use of a single finger. Considerable damage has been done to dimmer switch mechanisms as a result of their being pounded by the user with the palm or heel of an open hand or by the side of a closed hand or arm or other larger force delivering body member or implement. When a dimmer knob is struck in this manner it must withstand an appreciably higher force than normally used in switching and yet must operate the switch between the on and the off condition reliably. In addition it must continue to function satisfactorily in the rotary control of the light intensity. Considerable damage has been done for example to twisted rod push-push cam mechanisms which are particularly susceptible to be damaged by too strong an actuating blow on the control knob.

SUMMARY OF THE INVENTION

It is accordingly one object of the present invention to provide an indexing mechanism which can resist damage due to being struck with a large force.

Another object is to provide an indexing mechanism which can withstand the motion imparted to the mechanism by a relatively high velocity impact.

Another object is to provide an indexing mechanism which permits smooth rotary control motion coupled with a damage resisting plunger motion.

A further object is to provide a mechanism for a switch of shallow silhouette.

Another object is to provide an improved mechanism for a switch having a combination of push-in and rotary actuation.

Still another object is to provide a highly reliable switch mechanism having a combination of rotary and push-in actuation.

A still further object is to provide a mechanism the parts of which are simpler and more economical to manufacture and which can be assembled more efficiently than prior art switches of comparable performance capability, and which is nevertheless dependable and smooth in its operation.

A mechanism as provided pursuant to one form of this invention includes a rotor mounted in a supporting frame and having a set of ratchet teeth and at least one set of cams mounted in circular paths around the rotor. The mechanism also has a plunger capable of in-and-out motion and having an at-rest position. The plunger has an actuator mounted on its end to engage and act against the ratchet teeth to turn the rotor as the plunger is moved in. A spring is mounted to the supporting frame and extends between the supporting frame and the actuator to hold the actuator on the end of the plunger and to urge the plunger toward the at-rest position.

Other objects will be in part apparent and in part pointed out in the description which follows.

BRIEF DESCRIPTION OF THE DRAWING

The manner in which the present invention may be carried out will be made additionally clear by reference to the accompanying drawings in which.

DESCRIPTION OF THE PREFERRED EMBODIMENT

Figure 1:
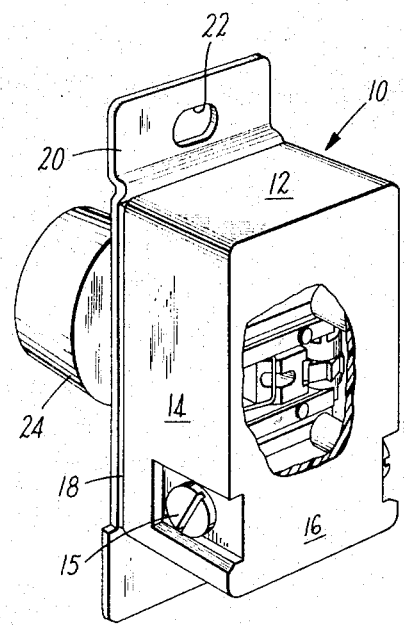
FIG. 1 is a perspective rear view of a mechanism such as is provided by the present invention shown within a switch housing which is partly broken away.
Figure 2:
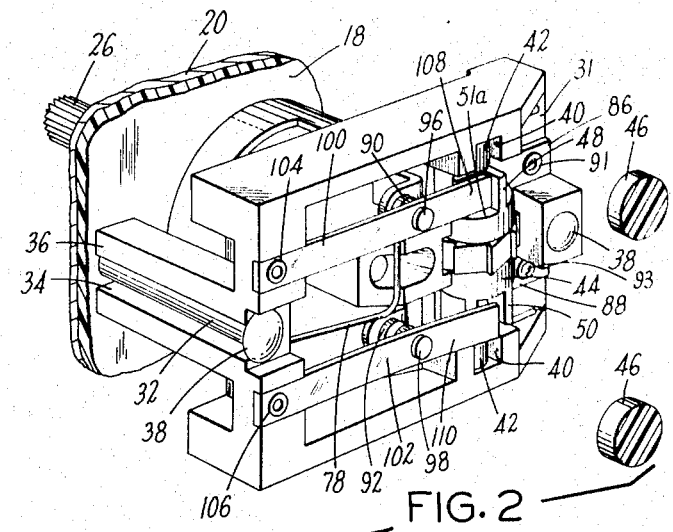
FIG. 2 is a more detailed view of such a mechanism with a greater portion of the housing removed and with the mechanism and related elements of a switch shown enlarged.

Referring now first to FIG. 1, an insulating housing 10 having end wall 12, side wall 14, and bottom wall 16 is shown in a perspective view with a portion of bottom wall 16 broken away to expose a mechanism in the interior of the housing. The insulating closure of the housing is completed by an insulating spacer 18 which is mounted between the housing 10 and the metal mounting bracket 20 having the conventional size and conventionally located mounting screw holes 22 for mounting in a wall box (not shown) in common use in the wiring device industry. A knob 24 mounted at the end 26 of a plunger 27 extending from the housing 10 provides the manual actuation of the mechanism by both rotary motions for lighting level control and by push-in motion for on-off control. Plunger end 26 is seen in FIG. 2 to be shown as the portion of the outer end of the actuating plunger 27 which remains when the knob 24 is removed. Terminal screw 15 permits wires supplying power to be connected to the dimmer.

Turning now to FIG. 2, essentially the same parts are shown as those seen through the broken away portion of the housing of FIG. 1, but the housing 10 is in this figure completely removed and the internal mechanism is shown enlarged as compared to the view seen in FIG. 1.

In addition to clarify the relationships of the various parts, only a portion of the insulating spacer 18 and of the metal mounting bracket 20 are shown. An insulating and supporting frame 30 is mounted to the bracket 20 by a pair of rivets 32, one of which is seen disposed in a channel 34 in the mounting leg 36 of the frame 30. Rivet heads 38 hold the frame 30 to the mounting bracket 20 and against the insulating spacer 18.

A rotor 44 is in the general form of a rod having a set of ratchet teeth 52 extending around its longitudinal center, two sets of cams 48 and 50 located on either side of the set of ratchet teeth 50 and end trunnions 42 of smaller diameter at each end of the rotor 44.

The trunnions 42 are mounted within trunnion wells 40 at the right hand side of the frame as seen in FIG. 2. The relationship of the rotor and its trunnions 42 to the trunnion wells 40 may be seen also in FIG. 4. The trunnions 42 are partly restrained within the wells 40 by a spring pressure exerted by the ends 108 and 110 of spring arms 100 and 102 respectively. Trunnion bosses 46, which may be seen in an exploded position in FIG. 2, and in place in FIGS. 1 and 4, also help keep the trunnions 42 of rotor 44 from leaving the trunnion wells 40 under severe jarring conditions.

Spring arms 100 and 102 are anchored in the frame 30 by rivets 104 and 106. The free ends 108 and 110 respectively of these arms 102 and 104 bear under spring pressure against the cams of cam sections 48 and 50 respectively. Rotation of cam sections 48 and 50, as rotor 44 itself rotates, causes a raising and lowering of the spring arm ends 108 and 110 and of the movable electrical contacts 96 and 98 respectively mounted in these arms. This motion of electrical contacts 96 and 98 relative to stationary electrical contacts 90 and 92 causes a make and break of electrical contact which provides the on-off function of the switch mechanism with which the indexing mechanism of this invention is associated.

Figure 3:
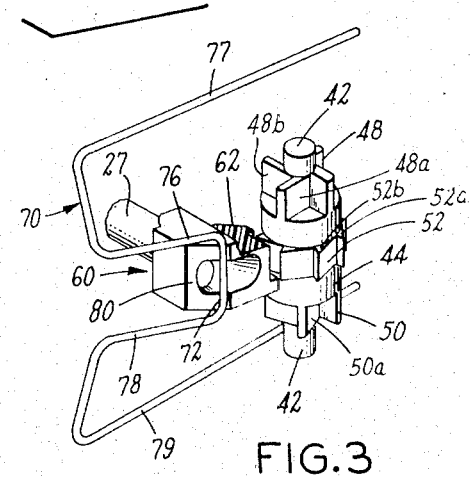
FIG. 3 is a perspective view similar to that of FIG. 2 but with additional elements of the switch omitted and with one element partly in section to show more clearly the relationship of the elements.

Turning now more specifically to the indexing mechanism as best seen perhaps in FIG. 3, the rotor 44 may be seen more clearly to include, in addition to the end trunnions 42, the pair of cam sections 48 and 50 located on either side of the centrally located ratchet section 52. The individual cams 48a and 48b of section 48 are angularly spaced at 90° to each other and to each adjoining cam. It will be noted that in the illustrative mechanism of FIG. 3 the cams such as cam 48a of cam section 48 are offset angularly from the cams such as cam 50a of cam section 50.

While in the specific illustration shown one set of cams may be seen angularly offset from the other set by approximately 45°, this need not be the case and the specific angle used may be modified as required by the application to which the indexing mechanism is to be put.

Also in the illustrative mechanism shown the ratchet teeth such as 52a are spaced at about 45° increments around the rotor 44 so that there are a total of eight teeth. Ratchet sections with larger or smaller numbers of teeth are contemplated. Also although the teeth such as 52a, 52b may be angularly aligned with the cams of the two cam sections 48 and 50, this is not necessary and their angular alignment may be independent of each other.

The alignment or absence of alignment of the ratchet teeth such as 52a or 52b with cams such as 48a or 48b is a function of such factors as length of the spring arms, the positioning of the end stop of the plunger stroke, diameter of the rotor, and other factors.

Figure 5:
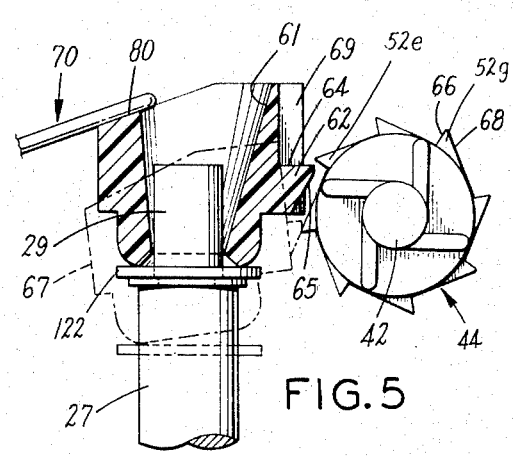
FIG. 5 is a detailed vertical elevation with one element shown in phantom and in section to illustrate the motion through which this element goes.

As seen best in FIG. 5 each ratchet tooth such as 52g has one surface 66, which is aligned essentially radially from the axis of the rotor 44 and another surface 68 which is aligned approximately tangentially with the surface of the rotor 44. In one actual embodiment the radially aligned surfaces of the ratchet teeth were undercut by about 15°.

An actuator 60 rides on the inner end of plunger 27 and moves reciprocally in and out as the plunger 27 moves in and out. Actuator 60 has an actuator tooth 62 in a position as seen in FIG. 3 confronting ratchet section 52 of rotor 44. Actuator tooth 62 also has a flat outwardly extending surface 64 poised to engage and push against the outwardly extending radial surface 66 of each ratchet tooth in sequence on the inward stroke of the plunger 27. Tooth 62 also has a bevelled surface 65 extending generally parallel to the similar tangential surface 68 of an adjacent ratchet tooth so that by cooperation of these two surfaces the activator tooth 62 may ride up and over the ratchet tooth such as 52a on the return or outward stroke of the plunger 27.

This pushing of a ratchet tooth such as 52a by the actuator tooth 62 imparts the indexing motion to the rotatable member 44 as the actuator 60 is advanced into the housing with the plunger as a result of a manual push on the outer end 26 of the plunger 27 extending out from the mounting strap 20.

A spring 70 having a general form of a W and made up of outer legs 77 and 79 and inner legs 76 and 78 with an inner connecting cross piece 72 is supported in frame 30.

While the plunger 27 is being pushed in there is a simultaneous deflection of a spring 70. The spring cross piece 72 rides on a beveled or ramp portion 80 of actuator 60 to impart a spring force to the actuator 60 and to urge it in two directions. One direction in which actuator 60 is urged by spring 70 is along the axis of the plunger 27 and this is the force which urges the plunger 27 to its outer and at-rest position. The other direction in which actuator 60 is urged is generally at right angles to the axis of plunger 27. The spring force acting on actuator 60 in this right angle direction is the force resulting from the division of the spring force into two component forces generally at right angles to each other due to the spring 70 acting on a beveled surface 80 of actuator 60 along a direction which is at an angle other than a right angle to the beveled surface. The component force at right angle to the axis of plunger 27 tends to keep the actuator 60 in engagement with the rotary member 44 or more precisely to keep the actuator tooth 62 in engagement with the teeth such as 52a of ratchet section 52.

In fact this spring force is what holds the actuator 60 on the inner end of the plunger 27 and permits the pivoting of the actuator 60 on the end of the plunger 27 regardless of the angular position to which the plunger 27 is rotated at the time the plunger 27 is put through an in-out motion to operate the indexing mechanism.

In other words this single spring 70 effectively provides, in proper balance, the return force for the plunger 27, the hold on force for the actuator 60 and the lateral force holding the actuator 60 against the rotary member 44. This lateral force must be low enough so that it is overcome during the return stroke of the actuator 60 in order that the actuator 60 may pivot in overriding the succeeding tooth, as 52a, of the ratchet section 52 of rotor 44.

On the inward stroke the force of return spring 70 is overcome by the manual pressure exerted by an operator. On the return stroke the spring force urging the actuator 60 toward the rotary member 44 is overcome by the wedging actions as the beveled surface 65 of the actuator tooth 62 rides up and over the tangential surface 68 of a ratchet tooth such as 52a.

Figure 4:
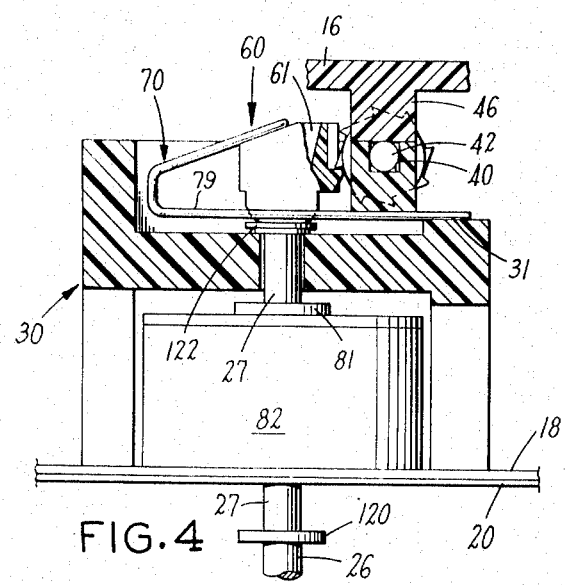
FIG. 4 is a vertical sectional view of the mechanism with parts of the switch housing broken away and with a portion of an element partly in section as in FIG. 3.

Referring next to FIG. 4 the extent of movement of the plunger 27 into the housing, and accordingly the extent of the push of the actuator 60 on a ratchet tooth such as 52a may be limited by a stop such as the shoulder ring stop 120 on plunger 27. This ring 120 may be set at any location on plunger 27 where the ring will be brought into contact with an appropriate surface. The ring 120 may be positioned to bear as shown in FIG. 4 against the outer surface of the mounting bracket 20.

As the plunger 27 has been pushed in and after it has advanced into the housing to its full extent permitted by a stop such as ring 120, it will be urged by the spring 70 back toward its initial at-rest position.

As noted above, spring 70 has the general configuration of a letter W and the cross piece 72 of spring 70 is the portion which bears against the beveled surface 80 at the innermost end of the actuator 60. The inner legs 76 and 78 of the W configuration as well as the outer legs 77 and 79 are bent upward toward the inner end of the plunger 27 from a shelf 31 of frame 30 on which the strands 77 and 79 are supported. The flat portions joining the inner and outer legs are also bent and are placed under torsional force so that there is a spring bias acting on the end of actuator 60 and along plunger 27 and tending to return the plunger 27 to its at-rest position. In this at-rest position, shoulder ring stop 81 may rest as shown against the upper portion of a potentiometer housing 82 or it may rest against a flat inner portion of frame 30.

An important and attractive feature in the return spring structure as shown in FIGS. 3 an 4 is the smooth operation and smooth build up of return and lateral forces on the plunger 27 and actuator 60 as the plunger 27 is moved into the housing 10. This smooth spring action is due in part to the folded or W configuration, of the wire spring 70 which serves the plunger return spring function. The folded configuration of the spring members results in the application of a force primarily down along the shaft of the plunger 27 and to a smaller degree laterally toward rotary member 44. The plunger 27 has greater tendency to bind where the spring return force has an excessive sideward component. This reverse bend of spring 70 permits the return force to operate primarily directly along the axis of the shaft and there is very even development of spring return force. The degree of the lateral component of the spring return force is determined by the angle of the beveled surface 80 and the degree to which the central cross piece 72 of spring 70 is moved off center relative to the shaft axis as the plunger is pushed in.

The action of this spring return force on the plunger 27 primarily along the axis thereof is to return it smoothly to its at-rest position. There is less tendency for the shaft to bind due to the cumulative influence of a sideward force being applied to the shaft through the very many strokes which the shaft makes during its useful life.

The lateral force generated by spring 70 on actuator 60 and lateral movement of actuator 60 during the return stroke of the plunger is taken up primarily in the actuator 60 as it is free to pivot and balance and to overcome and offset a lateral force which might otherwise be transmitted to the plunger 27. Thus although the actuator does go through lateral movement there is no binding of the plunger 27 due to this lateral movement. Switches of this construction have operated successfully through thousands of cycles of on-off switch actuation with no binding of the shaft or appreciable uneven wear of the shaft as would occur from a lateral force being applied to the shaft over such an extended useful life.

Returning now to FIG. 2 there are shown two sets of contacts including two fixed contacts 90 and 92 which are mounted in metal strips 86 and 88 and held in frame 30 at a lower shelf 31 by rivets 91 and 93 respectively. Two movable contacts 96 and 98 are mounted in spring arms 100 and 102. The fixed ends of spring arms 100 and 102 are at the left and are riveted by rivets 104 and 106 to the frame 30 so that suitable electrical connections can be made to the movable contacts 96 and 98 by sodering wires to the rivets 104 and 106. The spring arm ends 108 and 110 of the spring arms 100 and 102 engage the sets of cams 48 and 50 of the rotor 44.

Referring now first to the spring arm 100 operating against the cam set 48, it will be seen that the end 108 of the spring arm 100 rests in the recess 51a in the cam set 48 and effectively prevents counter rotation of the rotor 44. As rotor 44 rotates the end 110 or the spring arm 102 rides up on a cam of the cam set 50. Also as end 110 rides up on a cam of the set 50, movable contact 92 is separated from stationary contact 98 and opens or interrupts an electrical path in an appropriate circuit associated with these contacts 92 and 98 of the switch.

Because end 108 of spring arm 100 pushes against the side of the adjoining cam while residing in recess 51a and because only one of the cams, i.e., that below spring arm 100 can raise spring arm 100 out of the recess as rotor 44 rotates, no counter rotation of rotor 44 can occur. In other words the presence of spring arm 100 in recess 51a prevents counter rotation.

One of the features of this indexing mechanism is that it is adaptable for structures which provide both the rotary and push-push motion needed for dimmer type of operation. This adaptability is evident with reference to FIG. 4 where the relationship of the plunger 27 to the actuator 60 can be seen. An inner end of the plunger 27 is free to rotate within the actuator 60 as rotation of plunger 27 does not require the actuator to go through any rotary motion.

By turning the outer end 26 of plunger 27 a rotary motion is imparted to internal structure, not shown, in potentiometer 82. This permits adjustment through a dimmer mechanism of the lighting level of lighting loads controlled by the dimmer by means well known in the art. However, the actuator 60 does not undergo a rotary motion as plunger 27 is turned. This is because the inner end 29 of the plunger is free to turn within a shaft well 61 within the actuator 60. The plunger 27 can accordingly be rotated about its axis and within shaft well 61 both independently of the in-and-out motion of the plunger 27 and adaptor 60 and simultaneously with the in-and-out motion.

With this independent rotary motion, the plunger 27 can operate on a control element (not shown) of a potentiometer such as 82, shown in FIG. 4, to increase or decrease the resistance of a resistance element (not shown) of an associated dimmer circuit. This rotary motion accordingly controls the lighting level of a lighting load associated with a control circuit which includes potentiometer 82. Such dimmer control circuits are well known in the art and described in the General Electric SCR Manual, 4th Edition. A potentiometer such as 82 performs the conventional control function in controlling the phase shift of a triggering circuit. Some flattened portion on the shaft, where it passes through the potentiometer, permits the rotary motion to be transmitted to a control element of the potentiometer to effectively change the setting of the resistance element of the potentiometer.

From the figures it is evident that a switch incorporating an indexing mechanism of the present invention provides a combination of rotary and linear motions and is made up from a combination of components to provide this combined switching action within a structure of low silhouette. In one specific embodiment having the form shown in the accompanying figures the frame 30 had an overall depth for example of less than three quarters of an inch, and the overall mounting bracket 20 and housing enclosure 10 had overall depth dimensions of less than one and one quarter inch.

The depth dimension of the indexing and switching mechanism in the illustrative embodiment shown was appreciably less than one half inch the push stroke of the plunger 27 was less than one quarter of an inch. In part, this shallow depth is achieved because the plunger actuator 60 and rotor 44 are located side by side in the frame 30 and the ratchet actuator tooth 62 and return spring 70 are mounted in the same general plane in which the actuator 60 and rotor 44 are disposed. The overall dimensions of the frame 30 itself in which the several indexing and switching elements are mounted and contained are quite small being about one inch in width and less than one and one half inches in length for the form of product illustratively shown in the figures. Because of these small width and length dimensions, auxilliary switching or dimming components can be provided in the end portions of an insulating housing such as 10 in which the mechanism is mounted depending on the switching function to be performed. Such elements may include resistors, capacitors, solid state switches such as triacs or quadracs, audio frequency suppressing coils, and similar components as described in the art such as the General Electric SCR Manual, 4th Edition.

It is evident that the mechanism of FIG. 2 is adaptable for use as a three-way switch mechanism due to the presence of two sets of contacts 90 and 96 and 92 and 98 respectfully. When one of the stationary contacts such as 92 is omitted, the switch becomes a single pole switch device. The second spring arm 102 is included in either the single pole or three-way switches as it performs a function of preventing counter rotation of the rotor 44 as explained above.

Figure 6:
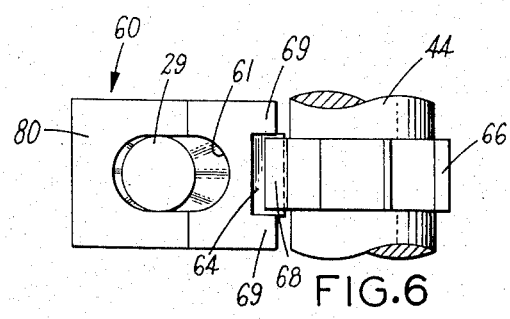
FIG. 6 is a top plan view of some of the elements of FIG. 5.

Referring next now to FIGS. 5 and 6 the construction of the actuator 60 and related elements of the indexing mechanism and their cooperation, is further explained employing the more detailed views of the mechanism given in these two figures. As explained above FIG. 5 is a side elevation of elements of the mechanism in part in section and in part in phantom illustrating the actuator 60 in two positions. FIG. 6 is a top plan view of the actuator 60 and ratchet section 52 of the rotor 44 shown in an at-rest position.

The view as seen in FIG. 6 shows the actuator 60 in its normal at-rest position with the narrowed inner terminal end 29 of plunger 27 in place in the funnel shaped well 61 in the actuator 60.

In the at-rest position a flat outwardly extending surface 64 of an actuator tooth 62 is below a radially extending surface 66 of a tooth such as 52e closest to the actuator and extending out from rotor 44. When an indexing force is applied to plunger 27 the actuator tooth 62 ascends and rotor 44 is rotated.

The position of the actuator 60 and its tooth 62 relative to the ratchet is seen in FIG. 5 where the actuator 60 is shown in section. When the actuator 60 is at the upper end of its stroke the flat outwardly extending surface 64 of tooth 62 is above the axis of the trunnion 42 of rotary member 44. Another ratchet tooth as 52d has been moved into place opposite the actuator 60 so that on the return stroke the beveled under surface 65 of tooth 62 comes into contact with the confronting tangential surface as 68*d* of the confronting tooth as 52*d*. As a result of the interaction the actuator 60 is pivoted away from the rotary member 44 as shown in the phantom outline 67 of FIG. 5.

The pivoting of the actuator 60 is on a washer 122 which is in turn supported on shoulder ring stop 81. Ring stop 81 in turn is inserted into a slot in plunger 27 at the shoulder formed as the plunger 27 narrows to its terminal end 29 within the adaptor well 61. The funnel shaped well 61 has this shape to permit the lateral pivot of the actuator 60 relative to rotary member 44.

Spring 70 acting against beveled surface 80 holds the actuator 60 and ring 122 on the plunger 27 in the various positions which the actuator 60 assumes during both the inward and return strokes of the plunger 27 and as the plunger 27 is rotated.

As the actuator 60 moves through its inward and outward strokes it is partly restrained from rotating on the end of plunger 27 by the guides 69 on either side of actuator tooth 62.

One feature of the structure of the present invention is the facility and economy with which the parts may be formed and may be handled during assembly. The actuator 60 serves the multiple purpose of providing a terminal of the plunger 27 in which the plunger 27 may rotate, a drive for the rotor 44 and a shaped surface 80 against which the return spring 70 may operate to induce both plunger return and actuator pivot motions.

What is claimed is:

1. An indexing mechanism which comprises,
   a rotor mounted for rotation within a supporting frame,
   said rotor having distributed around its perimeter a set of ratchet teeth and at least one set of cams,
   a plunger supported in said frame and mounted *in said* frame for rotational movement and for reciprocal axial movement by a plunger and return stroke relative to said frame,
   the long axis of said plunger being disposed to move generally at right angles to the axis of the rotor,
   said plunger having a pivotable actuator mounted at an end thereof proximate said rotor,
   said actuatory being urged into contact with said rotor under bias of a spring bearing against said actuator,
   said actuator being aligned to engage and advance a ratchet tooth on the plunger stroke of said plunger,
   a face of said actuatory bearing against said rotor being beveled to ride over the next ratchet tooth on the return stroke of said plunger.

2. The indexing mechanism of claim 1 in which the return stroke of said plunger is by means of a spring supported in said frame and acting on said actuator.

3. The indexing mechanism of claim 2 in which the spring acts on a beveled upper surface of said actuatory to induce both pivot return and linear return motions of the actuator.

4. The indexing mechanism of claim 1 in which the face of the actuator confronting said rotor has guides extending along each side of said set of ratchet teeth to limit rotation of said actuator.

5. An indexing mechanism which comprises
   a rotor mounted within a supporting frame,
   said rotor having distributed around its perimeter a set of ratchet teeth and at least one set of cams,
   a plunger in said frame and mounted for rotational movement and for reciprocal axial movement by a plunge and return stroke relative to said frame,
   said plunger being disposed to move generally at right angles to the axis of the rotor,
   said plunger having a pivotable actuator mounted at an end thereof proximate said rotor,
   said actuator being mounted on said plunger by means of a narrowed end portion of said plunger extending into the narrow end of a funned-shaped well in said actuator,
   said actuator being aligned to engage and advance a ratchet tooth on the plunger stroke of said plunger,
   said actuator being beveled to ride over the next ratchet tooth on the return stroke of said plunger.

6. The indexing mechanism of claim 5 in which the well has the form of a flattened funnel and the actuator pivots in a plane extending through the portion of said funnel having the largest cross-section.

* * * * *